United States Patent [19]

Brielmair

[11] Patent Number: 4,773,496
[45] Date of Patent: Sep. 27, 1988

[54] RADIATOR FASTENING ARRANGEMENT FOR INTERNAL COMBUSTION ENGINES, ESPECIALLY IN MOTOR VEHICLES

[75] Inventor: Martin Brielmair, Langengeisling, Fed. Rep. of Germany

[73] Assignee: Bayerische Motoren Werke Aktiengesellschaft, Munich, Fed. Rep. of Germany

[21] Appl. No.: 942,403

[22] Filed: Dec. 16, 1986

[30] Foreign Application Priority Data

Dec. 19, 1985 [DE] Fed. Rep. of Germany ....... 3545141

[51] Int. Cl.$^4$ .................................................. B60K 11/04
[52] U.S. Cl. .................................................. 180/68.4
[58] Field of Search .................. 180/68.4, 68.6, 68.5; 248/213.3, 213.4

[56] References Cited

U.S. PATENT DOCUMENTS

| | | | |
|---|---|---|---|
| 3,929,201 | 12/1975 | Hoffman | 180/68.4 |
| 4,121,682 | 10/1978 | Schaal et al. | 180/68.4 |
| 4,564,168 | 1/1986 | Ikuta et al. | 180/68.4 |
| 4,651,839 | 3/1987 | Isobe | 180/68.4 |

FOREIGN PATENT DOCUMENTS 0132844 7/1984 European Pat. Off. .
2634990 2/1978 Fed. Rep. of Germany .

Primary Examiner—John J. Love
Assistant Examiner—Richard Camby
Attorney, Agent, or Firm—Barnes & Thornburg

[57] ABSTRACT

In a radiator fastening arrangement for internal combustion engines with upper and/or lower brackets between body- and radiator-support places and elastic bearing elements between the brackets and the radiator-support places a cost-favorable, corrosion-secure and simply installable construction is provided in which the body support places consist of support surfaces, support edges and/or support apertures in body wall parts and-/or body bearers and the brackets consist of one-piece plastic molded parts which elastically prestressed and detent-like connected in a three-point support with two body-support places each and a single radiator support place each. A socket-shaped mounting device for a buffer-shaped bearing element secured at the radiator is formed-on at the lower brackets. The two body support places at the brackets are matched to the shape of the support places for a positionally safe and detent-like engagement. The brackets are so matched with their three-point supports together with the elastic bearing elements that an elastic prestress is achieved during the engagement of the brackets in the body-support places. For achieving a predetermined prestress and/or for the compensation of body dimensional tolerances, two elastic support arms arranged at an angle to one another are formed-on at the upper brackets whose free ends are supported against one another adjustably by way of a toothed arrangement within the area of the body-support place.

14 Claims, 2 Drawing Sheets

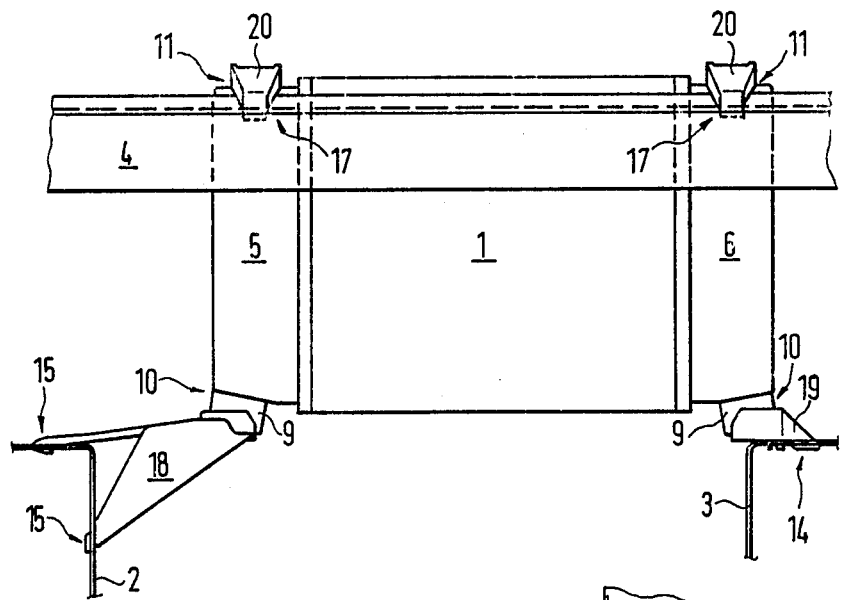
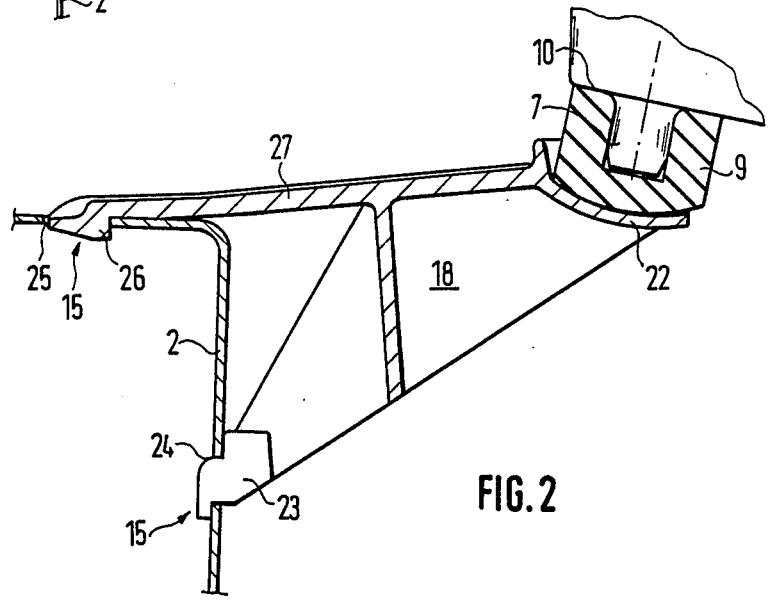

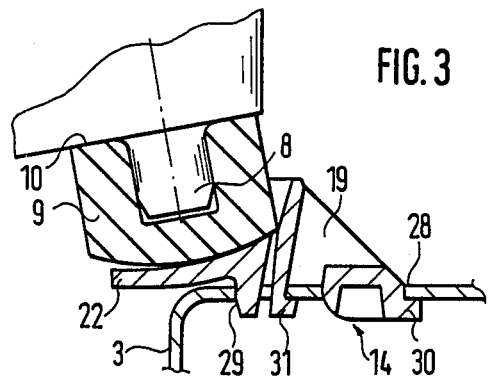
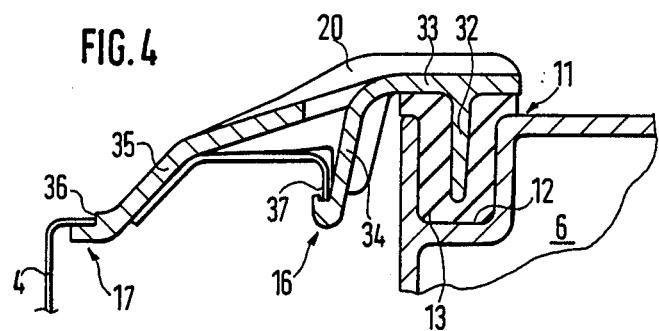
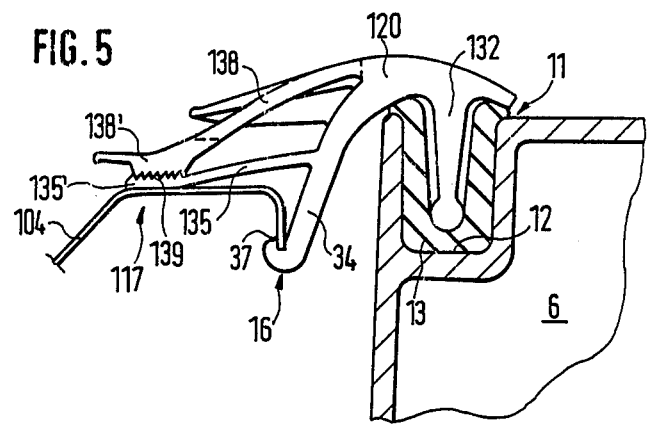

RADIATOR FASTENING ARRANGEMENT FOR INTERNAL COMBUSTION ENGINES, ESPECIALLY IN MOTOR VEHICLES

The present invention relates to a radiator fastening arrangement for internal combustion engines, especially in motor vehicles, with at least one upper and/or lower bracket between body- and radiator-support places and with an elastic bearing element form-lockingly interposed between the bracket and the radiator-support place.

A prior art radiator fastening of this type of construction according to the DE-OS No. 26 34 990 includes lower and upper brackets which are secured at the body support places by means of threaded or welded connections. Such fastening places are exposed to corrosion-danger and must have different fastening places at the body with the selective installation of differently large radiators. This requires both during the initial installation as also during eventual refitting a respectively different construction or a difficult refitting of the fastening places.

It is the object of the present invention to avoid the aforementioned difficulties and to so construct the radiator fastening that the corrosion danger is far-reachingly avoided as well as also the selective and subsequent installation of differently large radiators is possible without refitting the body fastening places.

As solution to the underlying problems, the present invention provides with the type of construction of a radiator fastening described above that the body-support place consists of a support surface, support edge or support aperture in a body wall part or body bearer and that the bracket consists of a one-piece plastic molded part, whereby the bracket is connected by means of a three-point support with a two-point-body-support place and with a single radiator support place under elastic prestress of the bracket and/or of the entire fastening arrangement and is lockingly secured at least at one body support place. In this manner, differently dimensioned brackets may be fastened and locked as well as clamped fast at the body support places positionally secured combined with very simple handling and differently large radiators can be secured selectively and also subsequently without further components and without refitting measures by means of these brackets. The far-reachingly areal abutment of the plastic brackets at the body support places precludes far-reachingly a corrosion danger of these fastening places.

According to further features to be described hereinafter, a particularly simple handling during the assembly of the radiator fastening is possible according to the present invention which enables the compensation of the dimensional tolerances unavoidable in series production and further makes possible the adjustment of a predetermined prestress at the upper brackets.

These and other objects, features and advantages of the present invention will become more apparent from the following description when taken in connection with the accompanying drawing which shows, for purposes of illustration only, two embodiments in accordance with the present invention, and wherein:

FIG. 1 is a front elevational view of a radiator-fastening arrangement in accordance with the present invention at body longitudinal and cross bearers of a motor vehicle;

FIG. 2 is a cross-sectional view through the lower body-and radiator-support place in accordance with the present invention;

FIG. 3 is a cross-sectional view through a further lower body-and radiator-support place in accordance with the present invention;

FIG. 4 is a cross-sectional view through an upper body-and radiator-support place; and FIG. 5 is a cross-sectional view, similar to FIG. 4, of a modified embodiment of the corresponding support place in accordance with the present invention.

Referring now to the drawing wherein like reference numerals are used throughout the various views to designate like parts, a radiator 1 for an internal combustion engine (not shown) is secured at lower longitudinal bearers 2 and 3 provided on both sides as well as at an upper cross bearer 4 of the body of a motor vehicle (not shown). The water boxes 5 and 6 on both sides of the radiator 1 are each provided in the lower area thereof with a formed-on mounting pin 7 and 8 (FIGS. 2 and 3) for buffer-shaped elastic bearing element 9 which is supported in each case against a flat ring-shaped support surface as lower radiator-support places 10. An aperture open in the upward direction is formed-on as support surfaces 12 (FIGS. 4 and 5) at the water boxes 5 and 6 as upper radiator-support places generally designated by reference numeral 11, whereby each aperture receives an elastic bearing element 13.

One bracket each 18, 19 and 20 or 21 is arranged at the lower longitudinal bearers 2 and 3, respectively, at the upper cross bearer 4 between the lower and upper elastic bearing elements 9, respectively, 13 and correspondingly coordinated lower and upper body-support places 14 and 15, respectively. 16 and 17. These brackets 18 to 21 consist each of a one-piece plastic molded part of fiber-reinforced high-strength plastic material of any known type. Each bracket 18, 19, 20 and 21 is connected by means of a three-point support with the two body-support places 14, respectively, 16 and 17 as two-point support and the radiator-support place 10, respectively, 11 under its own elastic prestress and/or under an elastic prestress of the entire fastening arrangement. One of the two body-support places 14, 15, 16 and 17 of each bracket is thereby so constructed as detent that in conjunction with the entire construction of the bracket and the respective second support place, an elastic prestress of the bracket results for securing its fastening at the body-support places.

One socket-shaped aperture 22 which is open in the upward direction (FIGS. 2 and 3) is formed-on at the lower brackets 18 and 19 for the support of the bearing element 9. For the detent fastening of the lower bracket 18 at the support places 15 on the longitudinal bearer 2, a lower detent support 23 is formed-on at this bracket 18 which engages from behind an aperture 24 in the longitudinal bearer 2 and fills out the same far-reachingly without play. For stabilizing the bracket 18, the lower support place is provided twice, one behind the other in the longitudinal direction of the longitudinal bearer 2 with sufficient spacing. The upper support place 15 of the bracket 18 is also provided with an aperture 25 in the top side of the longitudinal bearer 2 and with a hook-like detent nose 26 of the bracket 18 which is arranged at the free end of an elastic arm 27 of the bracket 18. The coordination of these components is dimensionally so matched that during the engagement of the detent nose 26 a fastening of the bracket 18 at the longitudinal bearer 2 results which is under a prestress.

The body-support places 14 for the bracket 19 consist also of two apertures 28 and 29 in the top side of the longitudinal bearer 3. Detent elements 30 and 31 are formed-on at the bracket 19 which engage in the apertures 28 and 29, completely filling out the same, and which lock under prestress. The bracket 19 rests areally on the top side of the longitudinal bearer 3 in such a manner that a stable support of the radiator 1 on all sides thereof at the support place 14.

The upper bracket 20 according to FIG. 4 engages with a tongue-shaped extension 32 positionally-securing in a corresponding opening in the bearing element 13. The extension 32 is surrounded on all sides with a support surface 33 between bracket 20 and bearing element 13. Starting from the support surface 33, the bracket extends by means of one support arm 34 and 35 each to the body support places 16, respectively, 17. The elasticity of the support arms 34 and 35 effects the prestressed fastening of the bracket 20, on the one hand, in an aperture 36 in the cross bearer 4, through which extends the end of the support arm 35 far-reachingly without play and which is engaged by the end of the support arm from behind, and the detent engagement of the hook-shaped end of the support arm 34 with a boundary edge 37 of the cross bearer 4. The elastic prestress of the bracket 20 additionally effects also an elastic prestress of the bearing element 13 and therewith the compensation of manufacturing tolerances within the area of the fastening arrangement of the radiator 1.

The bracket 120 according to FIG. 5 corresponds essentially to the construction of the bracket 20 according to FIG. 4. Differences consist in the construction of the tongue-shaped extension 132 with a cylindrical end area which, in conjunction with a movement play in the bearing element 113 permits a pivoting of the bracket 120 relative to the water box 6. The second support place generally designated by reference numeral 117 is constructed in this modified embodiment areally at the cross bearer 104. The bracket 120 includes for its support place 117 two specially elastically constructed support arms 135 and 138 which converge at an acute angle in the direction toward the support place 117 and whose free ends 135' and 138' are supported against one another adjustably in their prestress within the area of the support place 117 by way of a toothed arrangement 139 each.

The described radiator fastening arrangement for internal combustion engines, especially in motor vehicles, enables both during original manufacture as also during subsequent refitting the use of different radiator sizes alone by use of different brackets between support places at the body parts and at the radiator that remain unchanged. Therebeyond, a corrosion at the connecting places is precluded by the elastic engagement of the brackets at the body parts without metallic fastening parts and connecting places. Furthermore, the assembly of the radiator fastening is possible in a simple manner without tools by hand or by means of an automated assembly device and the disassembly requires only a simple tool, such as a screw driver, in order to release the respective detent engagement of the brackets.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A radiator fastening arrangement for internal combustion engines, comprising: upper and lower bracket means between body and radiator support places; an elastic bearing means form-lockingly interconnected between each of said bracket means and said respective radiator support place; each body-support place being formed by support means in a relatively fixed body part; each bracket means consisting of a one-piece plastic molded part connected to the body and radiator support places by means of a three-point support with two of the three-points connecting to said body support place and the third point connecting to said radiator support place under prestress; and wherein each of said bracket means is lockingly engaged at least at one of the body support places.

2. A radiator fastening arrangement according to claim 1, wherein the radiator fastening arrangement is in a motor vehicle.

3. A radiator fastening arrangement according to claim 1, wherein the support means is formed by one of support-surface, support-edge and support-aperture means.

4. A radiator fastening arrangement according to claim 1, wherein the support means is located in a body wall.

5. A radiator fastening arrangement according to claim 1, wherein the support means is formed in a body bearer means.

6. A radiator fastening arrangement according to claim 1, wherein the elastic prestress is realized by the bracket means.

7. A radiator fastening arrangement according to claim 1, wherein the elastic prestress is realized by the entire fastening arrangement.

8. An arrangement according to claim 1, wherein a socket-shaped mounting means open in the upward direction for a buffer-shaped bearing means secured at the radiator is formed-on at a lower bracket means.

9. An arrangement according to claim 8, wherein two supports of the bracket means with respect to the body support places are matched to the shape of the respective support means on the body side for a positionally secure and detent-like engagement of the bracket means.

10. An arrangement according to claim 9, wherein the three-point support of the upper bracket means at the body and radiator support places is dimensionally so matched that in cooperation with the elastic bearing means an elastic prestress acts on the bearing means and its support surface at the radiator.

11. An arrangement according to claim 10, wherein two support arms converging at an acute angle toward a body support place are formed-on at the bracket means, the free ends of said support arms being supported against one another adjustable in their prestress within the area of the body support place by way of a toothed arrangement each.

12. An arrangement according to claim 1, wherein two supports of the bracket means with respect to the body support places are matched to the shape of the respective support means on the body side for a positionally secure and detent-like engagement of the bracket means.

13. An arrangement according to claim 1, wherein the three-point support of the upper bracket means at the body and radiator support places is dimensionally so matched that in cooperation with the elastic bearing means an elastic prestress acts on the bearing means and its support surface at the radiator.

14. An arrangement according to claim 1, wherein two support arms converging at an acute angle toward a body support place are formed-on at the bracket means, the free ends of said support arms being supported against one another adjustable in their prestress within the area of the body support place by way of a toothed arrangement each.

* * * * *